United States Patent
Arcaini et al.

(10) Patent No.: US 6,589,654 B1
(45) Date of Patent: *Jul. 8, 2003

(54) CONSTRUCTION MATERIAL AND METHOD

(75) Inventors: Gianni B. Arcaini, Jacksonville, FL (US); Gary M. Carraux, Ponte Vedra Beach, FL (US); William R. Gibbes, Neptune Beach, FL (US); Takemoto Yashiro, Matsudo (JP); Takanori Hirao, Chiba (JP); Kaoru Ishizuka, Yokohama (JP)

(73) Assignee: Duos Engineering (USA), Inc., Jacksonville, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,985

(22) Filed: Oct. 10, 1997

(51) Int. Cl.[7] ............................................. B32B 15/00
(52) U.S. Cl. ....................... 428/402; 428/323; 428/406; 106/405; 106/407; 106/705; 588/256; 405/129; 405/263; 405/266
(58) Field of Search ................................. 428/323, 402, 428/406, 2; 106/405, 401, 705; 588/256; 405/129, 263, 266; 264/DIG. 49

(56) References Cited

U.S. PATENT DOCUMENTS

| 5,061,318 A | * | 10/1991 | Casey et al. | 106/705 |
| 5,130,051 A | * | 7/1992 | Falk | 252/315.5 |
| 5,164,008 A | * | 11/1992 | Casey et al. | 106/756 |
| 5,649,895 A | * | 7/1997 | Fix et al. | 588/256 |

FOREIGN PATENT DOCUMENTS

| JP | 10113637 A | * | 5/1998 |
| JP | 10174952 A | * | 6/1998 |

* cited by examiner

Primary Examiner—Paul Thibodeau
Assistant Examiner—Christopher Paulraj
(74) Attorney, Agent, or Firm—Lawrence J. Gibney, Jr.

(57) ABSTRACT

Construction material from granular material reclaimed from the ash of a municipal waste combustor wherein the ash is subjected to sorting and separating recovered metals, the granular material including particles having a maximum particle diameter of 5 to 40 mm, a U-coefficient of 10 or more, and ignition loss of 10% or less in weight and being subjected to at least one heavy metal immobilization agent, preferably phosphoric acid; and a second heavy metal immobilization agent consisting of ferrous sulfate. The ash is further subjected to drying before subjecting the ash to the at least one heavy metal immobilization agent. The ash is further subjected to mulling the material after subjecting the ash to the at least one heavy metal immobilization agent.

12 Claims, 2 Drawing Sheets

CONSTRUCTION MATERIAL AND METHOD

BACKGROUND OF THE INVENTION

1. Technical Field

This invention relates to construction material. In greater detail, this invention relates to construction material reclaimed from ash from municipal waste combustors (MWC) traditionally disposed of by landfill, which can be used safely as roadbase material.

2. Prior Art

Of the waste arising from urban activity, refuse consisting chiefly of combustibles has been disposed of by incineration, the ash thereof deposited in landfills. In recent years, however, sites for landfill disposal of combustor ash have decreased, making disposal increasingly difficult. Thus, there have been plans to reuse useful components included in MWC ash, thereby reducing the volume of combustor ash disposed of in landfills, and to employ such ash as a resource.

For example, Japanese Patent Application Publication Sho 56-124481 proposes processing MWC ash by recovering metal from such ash, followed by comminuting with a comminutor, adding sintering auxiliary agent for blending and granulating, and sintering and solidifying the resulting granulated substance in a sintering furnace. However, enormous energy is required to sinter and solidify granulated substances in a sintering furnace, and this is not only contrary to the tide of energy conservation, but it results in solidified substances not price competitive with natural aggregate.

On the other hand, Japanese Patent Application Publication Hei 1-16555 proposes mixing an appropriate amount of pit soil with combustor ash, then mixing a suitable quantity of unslaked lime therein, to create reclaimed earth. However, in many cases there are minute quantities of lead, chromium and other hazardous heavy metals in the combustor ash, presenting dangers in use for landfill or housing lots when merely mixed with pit soil and unslaked lime.

In addition, Japanese Patent Application Publication Hei 7-96263 proposes treating waste combustor ash by comminuting such ash, producing particle substances with particle size distribution of 10 mm or less in particle diameter, adjusting moisture content therein to 10 to 15% in weight, adding cement bonding agent at a ratio of 10 to 15% in weight relative to particle substances, followed by mulling and pressure molding in a mold to create concrete blocks. However, this method requires cement bonding agent and the pressure molding process. Moreover, despite stabilization of heavy metals contained in the combustor ash through such means as insolubility by the strong alkalinity of the cement, adsorption on hydrate surfaces of cement minerals, intra-hydrate replacement of atoms or radicals with metallic ions, physical sealing by cement gels, etc., it cannot be denied that after much time there is a risk of heavy metal leaching, concrete cracking, concrete deterioration and heavy metal discharge. Consequently, there has been demand for the development of materials for the economic and safe recycling of useful substances from MWC ash.

As a result of research to solve the foregoing problem, it was discovered that construction material can be derived from sorting, separating and drying MWC ash, the particles having maximum particle diameter of 5–40 mm with wide particle distribution, and containing only small quantities of moisture and unburned substances, with heavy metal immobilization agent added, and being mulled, California Bearing Ration has a revised CBR of 20% or more, making it useful and safe for use in various kinds of roadbase materials.

In other words, this invention provides:

(1) Construction material characterized in that it is obtained from sorting, separating and drying municipal waste combustor ash, the particles having a maximum particle diameter of 5–40 mm, a U-coefficient of 10 or more, and ignition loss of 10% or less in weight, with heavy metal immobilization agent added, and being mulled; and (2) The construction material set forth in paragraph (1), wherein the heavy metal immobilization agent is phosphoric acid and/or ferrous sulfate.

None of the methods of the prior art provide the desired end product.

SUMMARY OF THE INVENTION

In one aspect of the present invention there is provided construction material comprising granular material reclaimed from the ash of a municipal water combustor wherein the ash is subjected to sorting and separating recovered metals. The granular material includes particles having a maximum particle diameter of 5 to 40 mm, a U-coefficient of 10 or more, and an ignition loss of 10% or less in weight and is subjected to at least one heavy metal immobilization agent. Other aspects include the heavy metal immobilization agent being phosphoric acid. Also, the ash is further subjected to a second heavy metal immobilization agent consisting of ferrous sulfate. In another aspect of the invention the ash is subjected to both of two heavy metal immobilization agents comprising phosphoric acid and ferrous sulfate.

Additionally, the ash is further subjected to drying and also is further subjected to drying before subjecting the ash to at least one heavy metal immobilization agent. The ash is further subjected to mulling the material after subjecting the ash to at least one heavy metal immobilization agent. In another aspect of the invention steps are combined such that the ash is further subjected to drying before subjecting the ash to at least one heavy metal immobilization agent and further subjecting the ash to mulling after subjecting the ash to at least one heavy metal immobilization agent.

Finally, in another aspect of the invention the ash is sequentially subjected to (1) sorting according to particle size; (2) comminuting particles greater than 40 mm in size to a lesser size; (3) blending the particles of various sorted sizes to create a U-coefficient of 10 or greater; (4) drying; (5) at least one heavy metal immobilization agent; and (6) mulling. The ash is further subjected to a second heavy metal immobilization agent, wherein at least one heavy metal immobilization agent is phosphoric acid and another agent is ferrous sulfate. The granular material includes non-ferrous metals.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE PREFERRED EMBODIMENT INTRODUCTION

Figure 1A:
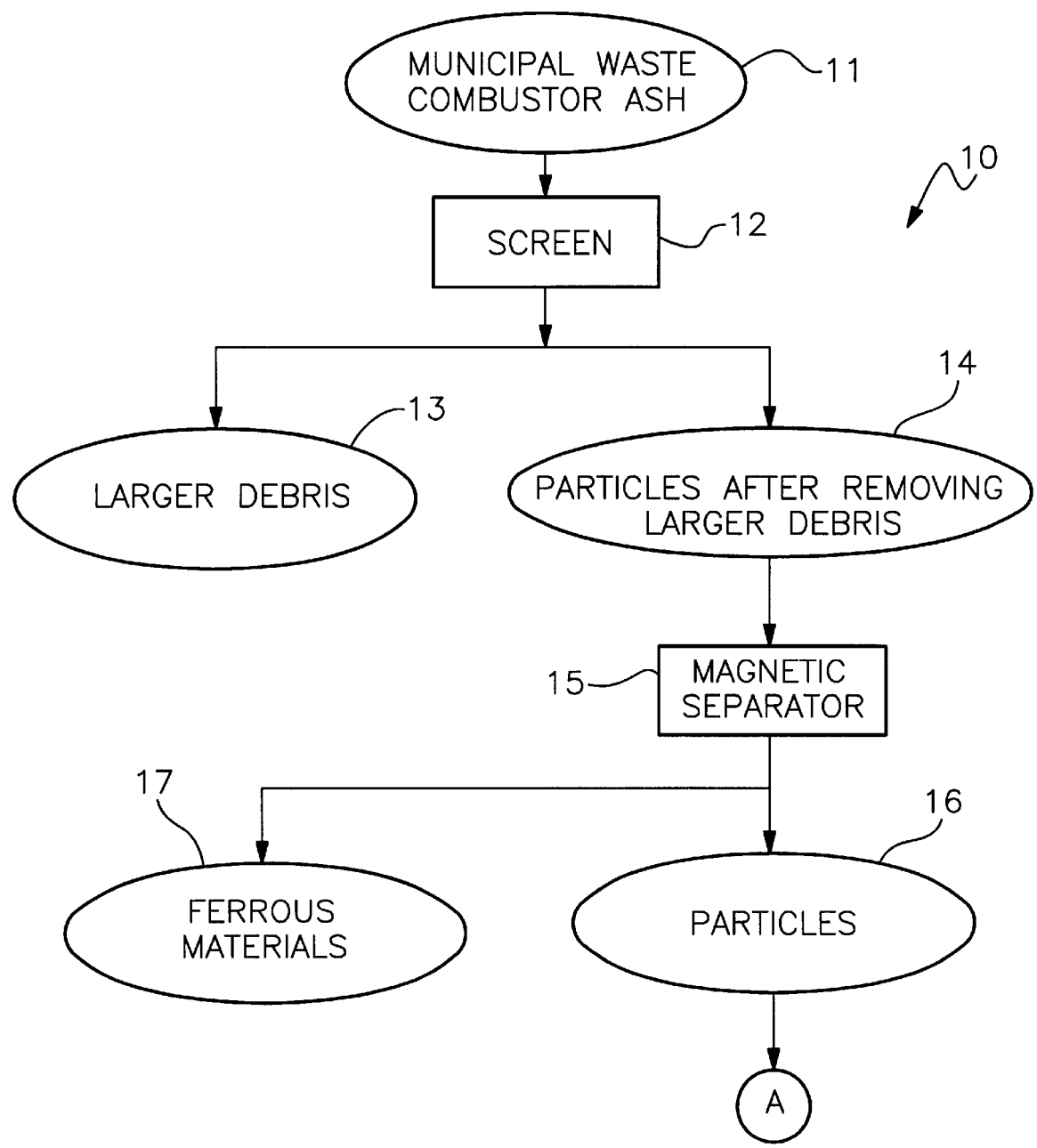
FIG. 1A and FIG. 1B depict a process flow chart illustrating the steps used to obtain the construction material in accord with the present invention.

The construction material of this invention is obtained from sorting, separating and drying municipal waste combustor (MWC) ash, the particles having a maximum particle diameter of 5–40 mm, a U-coefficient of 10 or more, and ignition loss of 10% or less in weight, with heavy metal immobilization agent added, and being mulled.

This invention uses particles of maximum particle diameter of 5–40 mm obtained from sorting, separating and drying MWC ash. The maximum particle diameter is the average value of the maximum and minimum diameters passing through the center of gravity of the shape of the projected area of the particle, with the projected area being largest projecting horizontally.

The maximum diameter of 5–40 mm for the particles used in this invention is adjusted so that the U-coefficient thereof is 10 or more. The U-coefficient (Uc) is calculated by dividing D60 (particle diameter mm when mass passage percentage is 60%) from particle size accumulation curve by D10 (that when 10%). Therefore, the larger the value of the U-coefficient, the wider the particle distribution. The U-coefficient of the particles may be adjusted upon appropriately blending the particles after sorting and separating.

The particles obtained from MWC ash used in this invention have ignition loss of 10% or less in weight. In accordance with JIS (Japanese Industrial Standards) R 5202, ignition loss is calculated by the ratio of sample weight to loss when particles are ignited at a constant 700 to 800 degrees C.

In this invention, the particles obtained by sorting, separating and drying MWC ash have a maximum particle diameter of 5–40 mm, a U-coefficient of 10 or more, and ignition loss of 10% or less in weight. Therefore, they have a revised CBR of 20% or more as required for sub-base roadbase material pursuant to standards of the Soil Engineering Society, thus being appropriate for use as roadbase and roadbed materials, aggregates for use in concrete and other construction material. In accordance with JIS A 1211, the revised CBR (California Bearing Ratio) is the ratio of load strength, at penetration volume of 2.5 mm when a penetration piston is penetrated into a tamped test piece, to standard load strength.

Where maximum particle diameter is either less than 5 mm or more than 40 mm, the value of the revised CBR value is less than 20%, presenting a risk that it may be inappropriate as construction material. Where the U-coefficient is less than 10, particle distribution would not be wide enough, and the revised CBR value is less than 20%, presenting a risk that it may be inappropriate as construction material.

Where particulate ignition loss is more than 10% in weight, the quantity of included moisture and unburned materials is excessive, presenting a risk that it may be inappropriate as construction material.

In this invention, particles obtained from MWC ash, having maximum particle diameter of 5 to 40 mm, a U-coefficient of 10 or more, and ignition loss of 10% or less in weight, have heavy metal immobilization agent added and are mulled. By adding heavy metal immobilization agent and mulling, even if heavy metals are contained within the particles, the heavy metals become stable and insoluble, and there is a significant reduction in the risk of leaching from the construction materials and causing secondary contamination to the environment. There is no particular restriction on the heavy metal immobilization agent used, but phosphoric acid, which forms an exsolute salt with many heavy metals, is suitable for use. Further, if the particles contain sexivalent hexivalent chromium, it would be difficult to avoid completely the elution thereof solely by phosphoric acid, but it would be possible to prevent the elution of sexivalent hexivalent chromium, by adding a reducing agent such as ferrous sulfate to reduce the sexivalent hexivalent chromium to trivalent chromium and form elution-retardant phosphate.

Figure 1B:
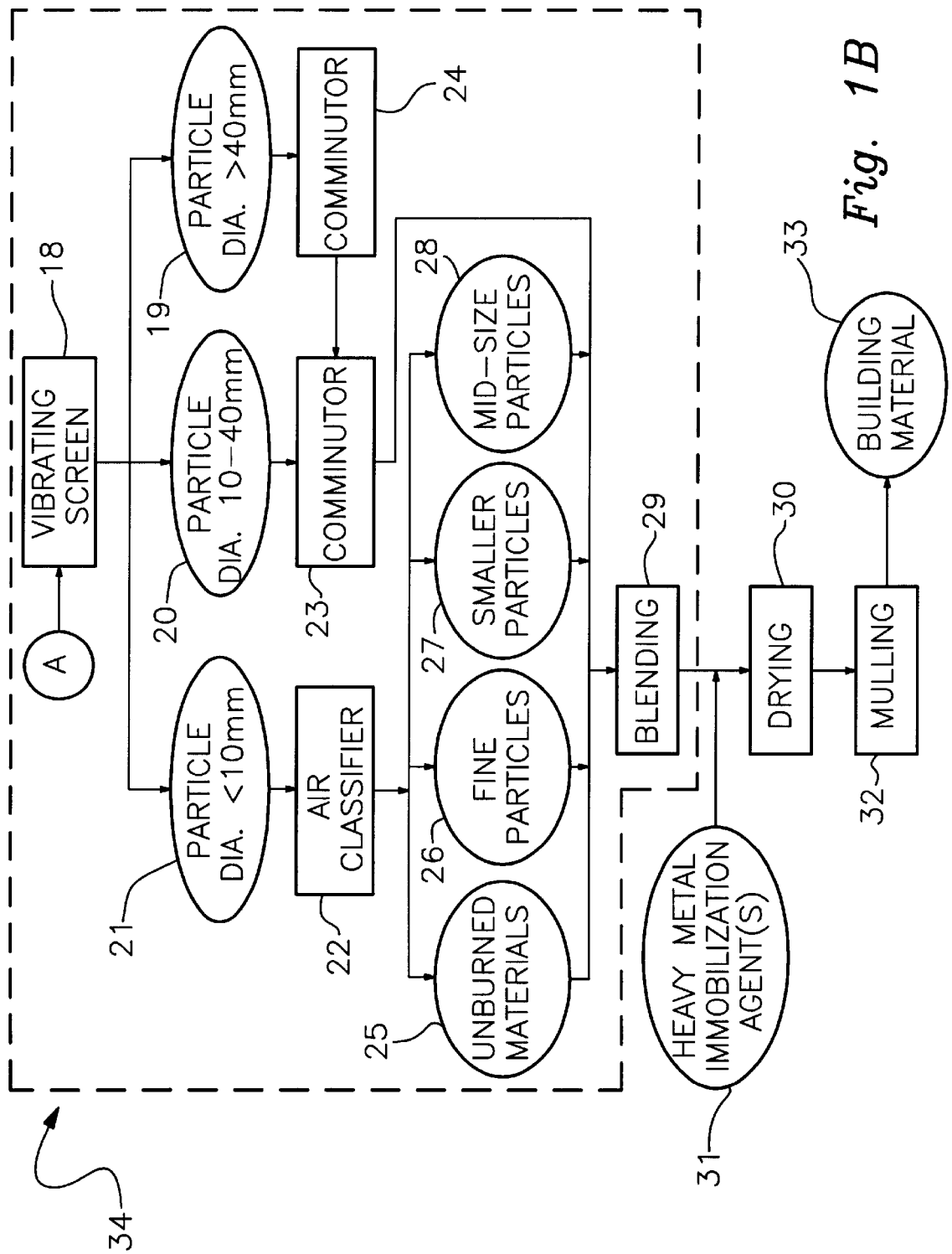

FIG. 1 is a process flow chart of one manufacturing method for the construction materials in accordance with this invention. MWC ash obtained from waste incinerators usually contains moisture of 35 to 40% in weight. After draining and drying this MWC ash, it is placed on a screen to remove larger debris. The particles after larger debris is removed are then directed to a magnetic separator to remove ferrous materials, and further sorted using a vibrating screen. Sorting can be carried out, for example, into particles with particle diameters of less than 10 mm, 10 to 40 mm, and more than 40 mm. The particles with a diameter of less than 10 mm are then directed to a air classifier to remove unburned materials and to further sort them into fine particles, smaller particles and medium-sized particles. As necessary, particles with a particle diameter of 10 to 40 mm and/or more than 40 mm can also be further comminuted and sorted.

By blending the particles sorted into fine, smaller and medium particles and those with a particle diameter of 10 to 40 mm, it would be possible to adjust the blended material to the prescribed U-coefficient. After drying this blended material having the prescribed ignition loss ratio, the construction material of this invention can be obtained therefrom by adding heavy metal immobilization agent and mulling.

The construction material of this invention can be manufactured through the simple process of sorting, separating, blending and drying MWC ash, and because the leaching of hazardous heavy metals can be prevented completely by adding heavy metal immobilization agent and mulling, this can be used effectively as roadbase material for public works.

In this invention, there is no particular restriction on the sequence and method of sorting, separating and drying the MWC ash, permitting voluntary combinations of publicly known methods. For example, usually as there are various sizes and particle diameters in combustor ash, from bulk refuse to fine grit, one may suitably combine removing larger debris by screening, comminuting by hammermill, sorting by vibrating screen, removing fine grit by air classifier, etc.

Separation of MWC ash, besides the aforesaid separation according to size and particle diameter, includes separation of steel and other ferromagnetic materials by magnetic separators, separation of unburned materials by air classifiers and the like, separation of low gravity matter by suspended classifiers, etc., and separation by employing appropriate combinations thereof.

As combustor ash generated by waste incinerators usually contains moisture of 35 to 40% in weight, it is advisable after collection thereof to drain and dry, dry naturally while sorting and separating, and, where necessary, dry with a suitable dryer. There is no particular restriction on the dryer, permitting rotary dryers, box heaters, tunnel dryers, etc.

Embodiments

Below we describe in greater detail certain embodiments of the present invention, but the invention is not restricted at all by these embodiments.

Embodiment 1

A truck received municipal waste combustor (MWC) ash from an MWC facility with a stoker-type plant having a processing capacity of 600 tons/day. The MWC ash contained 37% moisture, so it was left outdoors for two weeks and drained and dried, and the moisture became 20% in weight.

The drained and dried MWC ash was directed to a 60 mm screen to remove larger debris, then directed to a magnetic separator to remove ferrous materials. After removing larger debris and ferrous materials, the particles of MWC ash were then sorted by a vibrating screen into particles with particle diameters of less than 10 mm, 10 to 40 mm, and more than 40 mm.

Particles with a particle diameter of less than 10 mm were then directed again to a air classifier to remove unburned materials, and were sorted into fine particles, smaller particles and medium-sized particles. Also, the particles with a particle diameter of 10 to 40 mm were comminuted and sorted by a vibrating screen into particles with particle diameters of less than 10 mm,, 10 to 15 mm, 15 to 25 mm, and 25 to 40 mm.

The fine, smaller and medium-sized particles were blended with the maximum particle diameter being 10 mm, and blended material having a U-coefficient of 60 was obtained. This blended material had ignition loss of 6.8% in weight and was dried. Orthophosphoric acid of 1% in weight and ferrous sulfate of 0.01% in weight were added to the blended material so dried, and bulled, and roadbase material was obtained.

The revised CBR of this roadbase material when measured in accordance with JIS A 1211 was 50%, which exceeded the revised CBR of 20% required for sub base roadbase material.

Further, when 50 g of the roadbase material was added to 500 ml of deionized water, agitated for 6 hours, and the percolated water analyzed, the water had a pH of 10.2, and the concentration of heavy metals in the water was less than 0.01 mg/l for cadmium, less than 0.02 mg/l for lead, less than 0.01 mg/l for selenium, less than 0.02 mg/l for sexivalent hexivalent chromium, less than 0.01 mg/l for arsenic, and less than 0.0005 mg/l for mercury.

Comparison 1

To the dried, blended material obtained in the Embodiment shown, neither orthophosphoric acid nor ferrous sulfate was added, and 50 g of the blended material was added to 500 ml of deionized water. The water had a pH of 12.6, and the concentration of heavy materials in the water was less than 0.01 mg/l for cadmium, 1.4 mg/l for lead, less than 0.01 mg/l for selenium, 0.19 mg/l for sexivalent chromium, less than 0.01 mg/l for arsenic, and less than 0.0005 mg/l for mercury.

The results of Embodiment 1 and Comparison 1 are shown in Tables 1A and 1B.

TABLE 1A

|  | Embodiment 1 | Comparison 1 |
| --- | --- | --- |
| pH | 10.2 | 12.6 |
| Cd | <0.01 | <0.01 |
| Pb | <0.02 | 1.4 |
| Se | <0.01 | <0.01 |

TABLE 1B

|  | Embodiment 1 | Comparison 1 |
| --- | --- | --- |
| $Cr^6$ | <0.02 | 0.19 |
| As | <0.01 | <0.01 |
| Hg | <0.0005 | <0.0005 |

From the results in the Tables, it can be seen that absolutely no heavy metals leach from the roadbase material in Embodiment 1 when orthophosphoric acid and ferrous sulfate are added as heavy metal immobilization agents and mulled, but there is leaching of lead and sexivalent hexivalent chromium from the blended material in Comparison 1 when no heavy metal immobilization agents are added.

Embodiment 2

The fine particles, smaller particles, and medium-sized particles obtained in Embodiment 1 were blended with the maximum particle diameter being 10 mm, and blended material having a U-coefficient of 800 and ignition loss of 6.1% in weight was obtained. This blended material was dried. Orthophosphoric acid of 1% in weight and ferrous sulfate of 0.01% in weight were added to the blended material so dried, and mulled, and roadbase material was obtained.

The revised CBR of this roadbase material when measured in accordance with JIS A 1211 was 78%, which exceeded the revised CBR of 20% required for sub-base roadbase material.

Embodiment 3

The fine particles, smaller particles, medium-sized particles, particles with diameters of 10 to 15 mm and particles with diameters of 15 to 25 mm obtained in Embodiment 1 were blended with the maximum particle diameter being 25 mm, and blended material having a U-coefficient of 300 and ignition loss of 6.79% in weight was obtained. This blended material was dried. Orthophosphoric acid of 1% in weight and ferrous sulfate of 0.01% in weight were added to the blended material so dried, and mulled, and roadbase material was obtained.

In accordance with JIS A 1211, the revised CBR of this roadbase material when measured was 108%, which exceeded the revised CBR required for sub-base roadbase material by more than 80%

Comparison 2

The fine particles obtained in Embodiment 1 had a maximum particle diameter of 1 mm, and a U-coefficient of 20 and ignition loss of 6.5% in weight. These fine particles were dried. Orthophosphoric acid of 1% in weight and ferrous sulfate of 0.01% in weight were added to the fine particles so dried, and mulled, and roadbase material was obtained.

The revised CBR of this roadbase material when measured in accordance with JIS A 1211 was 8%, which fell below the revised CBR of 20% required for sub-base roadbase material.

Comparison 3

The particles obtained in Embodiment 1 with a particle diameter of more than 40 mm were sorted into particles with a particle diameter of 40 to 50 mm. The fine, smaller, and medium-sized particles and particles with diameters of 10 to 15 mm, 15 to 25 mm and 25 to 40 mm obtained in Embodiment 1 were blended with the said particles with diameters of 40 to 50 mm, with maximum particle diameter being 50 mm, and blended material having a U-coefficient of 300 and ignition loss of 6.5% in weight was obtained. This blended material was dried. Orthophosphoric acid of 1% in weight and ferrous sulfate of 0.01% in weight were added to the blended material so dried, and mulled, and roadbase material was obtained.

The revised CBR of this roadbase material when measured in accordance with JIS A 1211 was 18%, which fell below the revised CBR of 20 % required for sub-base roadbase material.

Comparison 4

The medium-sized particles obtained in Embodiment 1 had a maximum particle diameter of 10 mm, a U-coefficient of 5 and ignition loss of 6.4% in weight. These medium sized particles were dried. Orthophosphoric acid of 1% in weight and ferrous sulfate of 0.01% in weight were added to the medium-sized particles so dried, and mulled, and roadbase material was obtained.

The revised CBR of this roadbase material when measured in accordance with JIS A 1211 was 15%, which fell below the revised CBR of 20% required for sub-base roadbase material.

Comparison 5

The particles with a particle diameter of less than 10 mm obtained in Embodiment 1 had a maximum particle diameter of 10 mm, and a U-coefficient of 800, and ignition loss of 12.5% in weight. Orthophosphoric acid of 1% in weight and ferrous sulfate of 0.01% in weight were added to these particles including unburned materials, and mulled, and roadbase material was obtained.

The revised CBR of this roadbase material when measured in accordance with JIS A 1211 was 18%, which fell below the revised CBR of 20% required for sub-base roadbase material.

The results of Embodiments 1 to 3 and Comparisons 2 to 5 are shown in Table 2.

TABLE 2

|  | Maximum Particle Diameter (mm) | U-coefficient | Ignition Loss (wt %) | Revised CBR (%) |
|---|---|---|---|---|
| Embodiment 1 | 10 | 60 | 6.8 | 50 |
| Embodiment 2 | 10 | 300 | 6.1 | 73 |
| Embodiment 3 | 25 | 300 | 6.7 | 108 |
| Comparison 2 | 1 | 20 | 6.5 | 8 |
| Comparison 3 | 50 | 300 | 6.5 | 18 |
| Comparison 4 | 10 | 5 | 6.4 | 15 |
| Comparison 5 | 10 | 800 | 12.5 | 18 |

From the results in Table 2, it can be seen that the construction materials of the present invention in Embodiments 1 to 3 have revised CBR values that greatly exceed the 20% required for sub-base roadbase material, and in particular, the construction material in Embodiment 3 exceeds the requirement for sub-base roadbase material by more than 80%.

In contrast, the revised CBR values for each of the construction materials of Comparison 2 with a small maximum particle diameter, of Comparison 3 with a maximum particle diameter that is too large, of Comparison 4 with a small U-coefficient, and of Comparison 5 with large ignition loss and including unburned materials, did not achieve the required 20% for sub-base roadbase material, and do not possess adequate properties as roadbase materials.

The construction material of the present invention can be manufactured from municipal waste combustor ash through a simple process, and because the leaching of hazardous heavy metals can be almost completely prevented by the addition of heavy metal immobilization agents and mulling, this can be used effectively for public works.

The Process Flow

The figure includes a process flow chart of the method used to provide construction material in the present invention. The process 10 begins with an input of ash 11 which is sorted as to size by screen 12. Larger debris 13 is removed from the process while smaller particles 14 are sent to a magnetic separator 15 to be divided into ferrous materials 17 and other particles 16 which includes heavy metals such as lead. The particles 16 are sent to vibrating screen 18 for division into three sizes: (1) particles 19, which are greater than 40 mm in size; (2) particles 20, which are between 10 and 40 mm; and (3) particles 21, which are less than 10 mm.

Particles 19 and 20 are directed to respective comminutors 24 and 23 for further size reduction. Particles 21 are sent to the air classifier 22, a cyclone separator technology, for removal of unburned material 25 form the process.

Fine particles 26, smaller particles 27 and medium-size particles 28 from air classifier 22 are sent to blending 29 and from there to drying 30.

Heavy metal immobilization agent(s) 31 are employed as required. The material is crushed at mulling step 32 and from there is usable as building material 33. Control of the U-coefficient is principally in the steps indicated in block 34.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. Construction material consisting of granular material reclaimed from the ash of a municipal waste combustor wherein the ash is subjected to sorting and separating recovered metals, said granular material including particles having a maximum article diameter of 5 to 50 mm, a U-coefficient of 10 or more, and ignition loss of 10% or less in weight and at least one heavy metal immobilization agent being added to said granular material followed by mulling the resulting material.

2. The construction material as defined in claim 1 wherein the heavy metal immobilization agent is phosphoric acid.

3. The construction material as defined in claim 2 wherein the ash is further treated by adding thereto a second heavy metal immobilization agent consisting of ferrous sulfate.

4. The construction material as defined in claim 1 wherein the ash is treated by adding thereto two heavy metal immobilization agents comprising phosphoric acid and ferrous sulfate.

5. The construction material as defined in claim 1 wherein the ash is further subjected to drying.

6. The construction material as defined in claim 5 wherein the ash is further subjected to drying before the addition of at least one heavy metal immobilization agent.

7. The construction material as defined in claim 1 wherein the ash is further subjected to drying before adding said at least one heavy metal immobilization agent.

8. The construction material as defined in claim 1 wherein the ash is sequentially subjected to (1) sorting according to particle size; (2) comminuting particles greater than 40 mm in size to a lesser size; (3) blending the particles of various sorted sizes to create a U-coefficient of 10 or greater; (4) drying; (5) the addition of at least one heavy metal immobilization agent; and (7) mulling.

9. The construction material as defined in claim 8 wherein the ash is further treated by the addition of a second heavy metal immobilization agent.

10. The construction material as defined in claim 8 wherein said at least one heavy metal immobilization agent is phosphoric acid.

11. The construction material as defined in claim 8 wherein said at least one heavy metal immobilization agent is ferrous sulfate.

12. The construction material as defined in claim 8 wherein said granular material includes non-ferrous metals.

* * * * *